United States Patent [19]
Boucher

[11] 3,942,742
[45] Mar. 9, 1976

[54] CABLE GUIDE MEANS FOR A CABLE DRUM

[75] Inventor: Harry Boucher, Odessa, Tex.

[73] Assignee: Gardner-Denver Company, Dallas, Tex.

[22] Filed: Sept. 16, 1974

[21] Appl. No.: 506,620

Related U.S. Application Data

[62] Division of Ser. No. 386,758, Aug. 8, 1973, Pat. No. 3,842,501.

[52] U.S. Cl........... 242/157 R; 226/196; 242/47.09; 254/190 R
[51] Int. Cl.²......................................... B65H 57/14
[58] Field of Search.......... 242/157 R, 47.01, 47.08, 242/47.09, 47.1, 47.11, 47, 54 R; 226/118, 183, 196; 254/175.7, 175.5, 190 R

[56] References Cited
UNITED STATES PATENTS

| 2,765,905 | 10/1956 | Sandford..................... 226/183 X |
| 2,773,587 | 12/1956 | Middleditch, Jr............ 242/47.09 X |
| 3,044,723 | 7/1962 | Blue............................... 242/47.09 |

FOREIGN PATENTS OR APPLICATIONS

| 29,151 | 1/1922 | Denmark......................... 226/183 |

Primary Examiner—Stanley N. Gilreath
Attorney, Agent, or Firm—Marcus L. Bates

[57] ABSTRACT

A cable guide means comprised of spaced spools having spaced grooves thereon for guiding a cable to and from a cable driven drum so that spaced marginal lengths of the cable do not wear against one another as the cable changes directions in order to be rove about the drum.

7 Claims, 4 Drawing Figures

3,942,742

CABLE GUIDE MEANS FOR A CABLE DRUM

RELATED PATENT APPLICATIONS

This patent application is a division of my co-pending patent application Ser. No. 386,758 filed Aug. 8, 1973 entitled "Recording Instrument for Determining Rate of Penetration in a Borehole," now U.S. Pat. No. 3,842,507.

BACKGROUND OF THE INVENTION

Cable driven drums usually have the cable thereof wound thereabout in a manner whereby marginal lengths of the cable which are spaced apart by the drum usually travel in the same, or nearly the same direction, as pointed out in my co-pending patent application referred to above. It is advantageous to arrange the spaced marginal lengths of the cable going to and from the drum in a relative manner whereby they do not wear against one another. Otherwise the accelerated wear rate brought about by such an undesirable arrangement necessitates early replacement of the cable.

It is therefore desirable to have made available cable guide apparatus which can receive the cable going to and from the drum and cause it to be rove about the cable drum in a manner to preclude spaced outer surfaces of the cable lengths from wearing against one another. This desirable expedient not only greatly reduces wear on the cable as well as the drum, but also prevents the cable from climbing on top of itself and becoming entangled, which would preclude reliability of operation so far as regards precision with which the drum is driven by the cable.

SUMMARY OF THE INVENTION

The instant invention relates to cable guide means for guiding cable to and from a cable driven drum. The cable guide means includes spaced spools rotatably mounted in spaced relation to one another and to the drum with spaced circumferentially extending grooves being located on each of the spools so that when the spools are properly arranged respective to one another and to the drum, a cable can be rove along one groove, about the drum, and back through the second groove so that marginal spaced lengths of the cable going to and from the drum do not wear against one another.

Accordingly, a primary object of the present invention is the provision of a cable guide means for guiding cable to and from a cable drum.

Another object of the invention is to provide a new combination of a cable, a cable guide means, and a cable driven drum for preventing wear from one part of the cable rubbing on another part thereof.

A further object of this invention is to provide an improved guide means for a cable which drives a drum so that adjacent marginal lengths of the cable are prevented from wearing against one another.

A still further object of this invention is to provide a guide means for maintaining the cable of a cable driven drum assembly separated from one another as the cable is rove to and from the drum.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Throughout the various figures of the drawings, like or similar numerals, wherever it is practical to do so, will refer to like or similar elements.

Figure 1:
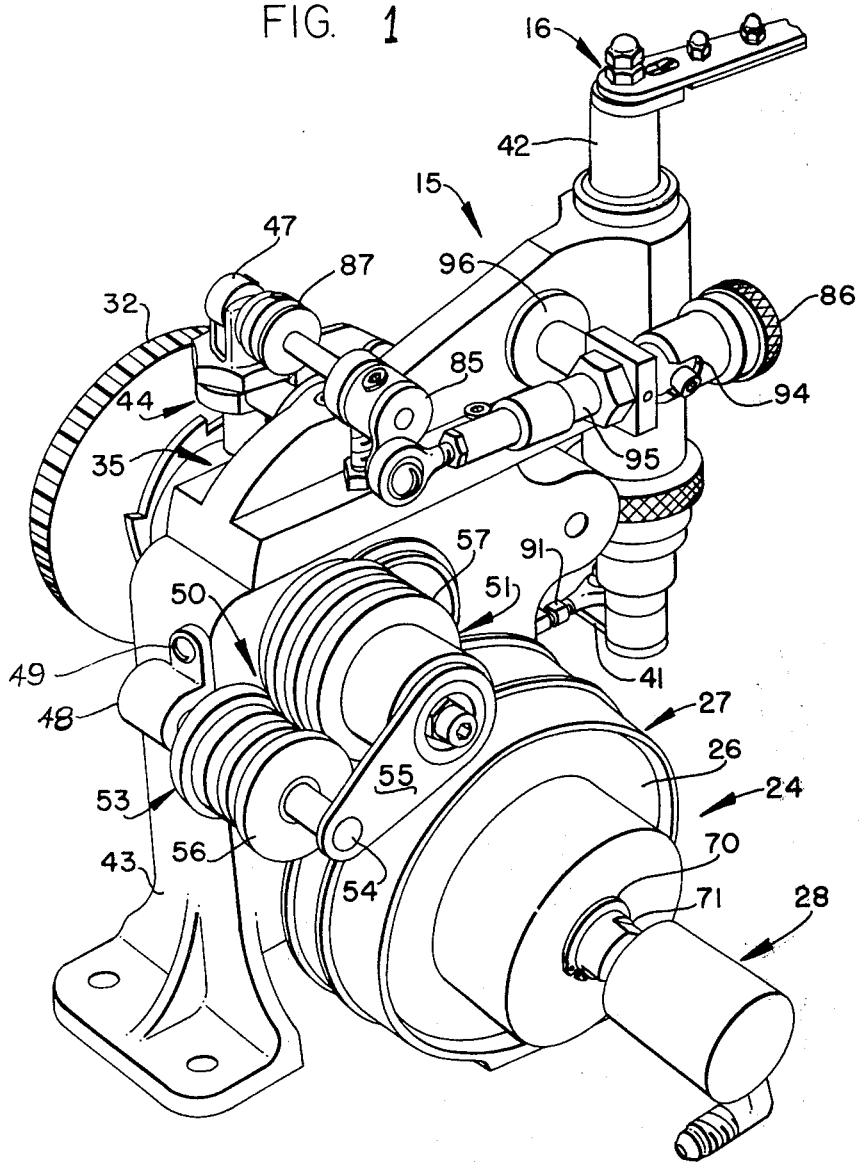
FIG. 1 is a perspective view which discloses apparatus made in accordance with the present invention operatively disposed in association with a cable driven drum of a recording instrument.
Figure 2:
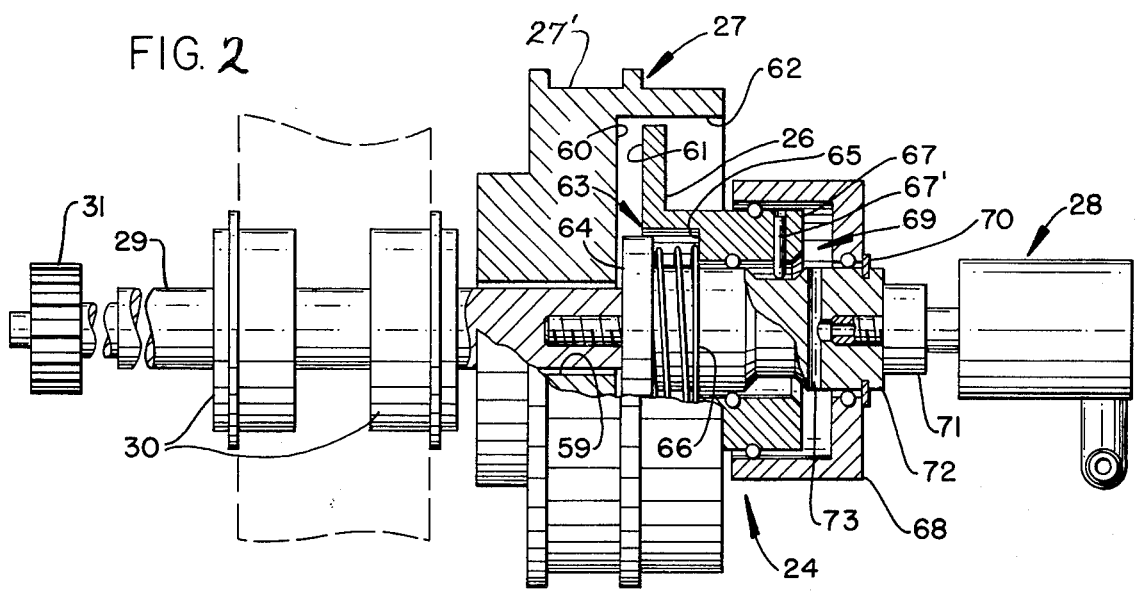
FIG. 2 is an enlarged, part cross-sectional, fragmentary, elevational view of a cable driven drum assembly which can be used in conjunction with the present invention.

In FIG. 1 there is broadly illustrated a recording apparatus 15 having a pin assembly 16 affixed thereto so that rotation of a cable drum assembly 24 causes the pin to pivot, thereby enabling the pin assembly to be utilized for recording indicia in the usual manner.

The details of the drum assembly 24 are more fully disclosed in the above referred to co-pending patent application. As seen in the figures of the drawings, the drum receives a cable 25 rove thereabout in a particular manner while a clutch actuator 26 releasably engages a clutch plate located on a relative rotatable drum member 27. The cable engages face 27' of the drum member. A stationary swivel 28 provides an air supply for remotely actuating the clutch assembly in a controlled manner. Drive shaft 29 is journaled in aligned relationship between spaced support bearing means 30 so that drive gear 31 is rotated one revolution in accordance with one foot of movement of cable 25 and 25' when the clutch is engaged.

Figure 3:
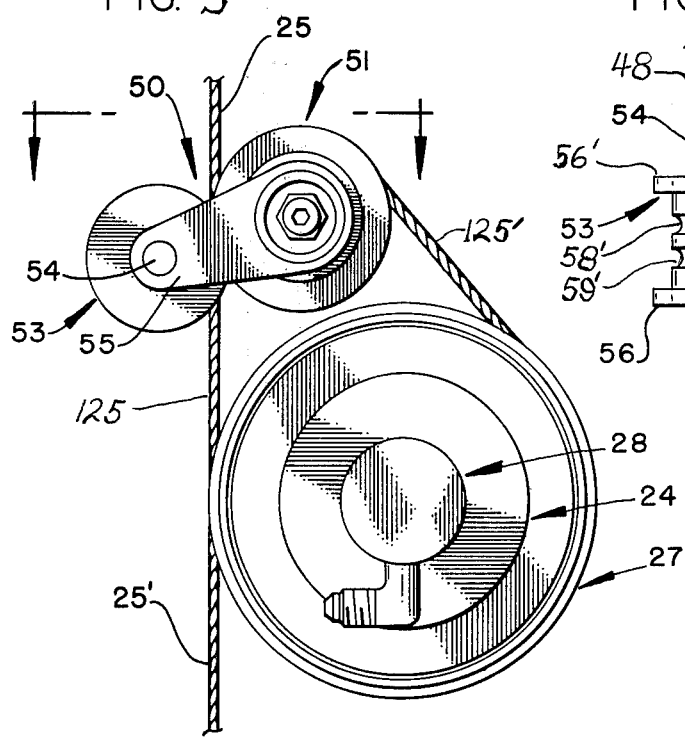
FIG. 3 is a side elevational view of part of the apparatus disclosed in FIG. 1; and, FIG. 4 is a fragmentary top plan view disclosing part of the apparatus seen in FIG. 1.
Figure 4:
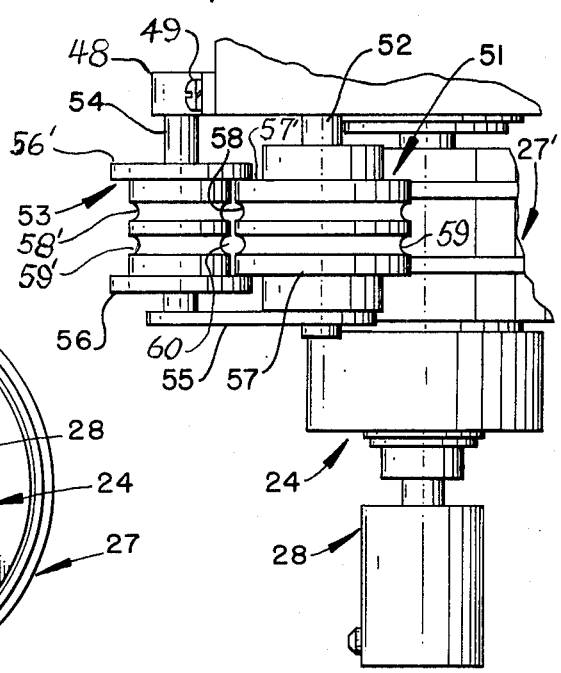

As seen in FIGS. 1, 3, and 4, a cable guide means 50, made in accordance with the present invention, is comprised of a large or first spool 51 rotatably mounted in close tolerance relationship upon a first fixed shaft 52. The shaft has the fixed end thereof mounted within a counterbore formed within the main body 43, for example, by threadedly engaging a marginal fixed end thereof with a threaded interior of the counterbore.

A small or second spool 53 is rotatably mounted in close tolerance relationship upon a second shaft 54. The second shaft has a fixed end which is secured to the housing or main body 43 by a clamp 48 and fastener means 49.

Link 55 spaces the free end portions of the shafts from one another and captures the first and second spools on a marginal length of their respective shafts. The link is rigidly affixed to the outermost end portion of shaft 54 and removably affixed to the outwardly depending end of shaft 52 by the illustrated fastener means. One spool 53 is provided with spaced apart circumferentially extending outwardly directed flanges 56 and 56' while the other spool is provided with spaced shoulders 57 and 57' which are also in the form of flanges. The flanges of each spool are of a diameter which enables one spaced pair thereof to be received within the other spaced pair so that the circumferentially extending grooves 58, 58' and 59, 59' are maintained properly aligned with one another with the illustrated spaced apertures 60 being formed by the cooperative action of the adjacent grooves.

Hence the grooves of one spool, when indexed or brought into registry with the grooves of another spool, form spaced apertures, one of which is indicated by the numeral 60.

The axial center line of the two spaced apart spools coincide with the axial center line of their respective shafts, and the spaced shafts of the large and small spools are parallel to the axial center line of the drum 24 while the axial centerline of the drum, the large spool, and the small spool is placed normal to the before mentioned cable 25.

Cable 25 is of a size relative to the spaced cable grooves of the first and second spool so that the resultant aperture 60 loosely captures the cable therewithin. This expedient enables the cable to be brought from the traveling block of a borehole forming apparatus, for example, and into the illustrated position indicated by numeral 25 in FIG. 3. The cable continues through one of the apertures 60, and circumferentially extends for approximately 225° about face 27' of the drum, where the cable then tangently leaves the drum near numeral 125' and is received by cable groove 59. The cable continues for approximately 135° about the groove 59 where it emerges at 25' so that it can be connected to a wind-up reel or a counterbalance as may be required in order to maintain the traveling cable taut.

The spaced flanges 56' and 57' maintain the cable grooves 59, 59', 58, and 58' aligned relative to one another so that the spaced apertures 60 through which the cable is rove are always properly aligned with respect to one another. The spaced flanges on the drum which form the cable engaging face 27' also assists in maintaining the cable and the spools in properly aligned relationship with one another.

The present invention provides a cable guide means 50 for a cable driven drum 24 wherein the drum is rotatably mounted to a housing and rotated by a cable 25 rove thereabout in the manner of FIG. 3. The cable guide means is mounted to the cable drum housing for guiding the cable to and from the drum so that spaced marginal lengths of the cable do not wear against one another. The cable guide means includes the before mentioned spaced shafts 52 and 54 which are affixed to the housing at 48 and 52 and positioned with the central axis thereof being disposed parallel to one another and to the axial centerline of the drum and normal to a cable rove about the spools and the drum.

One of the spools, as for example the first spool 51, is rotatably mounted on a first of the shafts 52; a second spool 53 is rotatably mounted on a second shaft 54, with each spool having spaced flanges 57, 57' and 56, 56' which define the length thereof. Spaced circumferentially extending grooves 59, 59' and 58, 58' are located between the flanges so that the spaced flanges of one spool overlap the spaced flanges of another spool to thereby capture one spool within the other, so that the circumferentially extending grooves thereof are placed in properly aligned relationship with one another, thereby leaving spaced apertures 60 through which the cable can be placed in order to direct it to and from the cable driven drum in accordance with the present invention.

I claim:

1. In a cable driven drum rotatably mounted to drum support structure by a drum shaft and rotated by a cable having opposite moving marginal cable lengths spaced from a central marginal portion which is rove about the drum, the combination with said cable and drum of a cable guide means for separating said opposite moving marginal cable lengths from one another while guiding the cable to and from the drum;

said cable guide means having spaced shafts affixed to the recited support structure and positioned with the longitudinal central axis thereof being parallel to one another and to the drum shaft, and normal to the cable rove about the drum;

a first spool rotatably mounted on a first of said spaced shafts, a second spool rotatably mounted on a second of said spaced shafts, each spool having spaced flanges defining the cable receiving width thereof, and spaced circumferentially extending cable receiving grooves located between said flanges;

said spaced shafts being arranged relative to one another and the support structure and drum such that the flanges of one spool are received in overlapping relationship respective to the flanges of the remaining spool; said grooves of one said spool being positioned respective to the grooves of the remaining spool and to the cable bearing portion of the drum to provide spaced cable receiving apertures between said spools which can loosely capture spaced marginal lengths of the cable when the cable is placed therethrough;

said cable having a marginal length rove through one said aperture and about part of one spool, about part of the drum, back around part of said one spool, and through the remaining aperture to thereby maintain the marginal opposite moving lengths of the cable separated from one another while the cable travels to and from the drum.

2. The combination of claim 1 wherein the first spool is smaller than the second spool, the diameter of the large spool being of a size which provides a cable bending radius compatible with the cable being roved about the cable drum, so that the cable can be received by a marginal length of one of the grooves of the large spool before it is received about the drum, and thereafter the cable can be received by a marginal length of the remaining groove of the large spool to thereby maintain marginal portions of the cable separated from one another as the cable is guided to and from the drum.

3. The combination of claim 1 wherein said means by which said spools are journaled in spaced relationship relative to each other includes a first and second shaft, each spool being rotatably received upon a shaft, the last said means supports one marginal end portion of each said shaft, a link affixed to the remaining end portion of each said shaft and capturing the spools on a central marginal length of the shafts, so that the link can be removed to enable replacement of the spools.

4. The cable guide means of claim 3 wherein said link is rigidly affixed to one shaft and slidably received by the other shaft, a fastener means removably affixing said link to said other shaft, so that said other shaft can have one end affixed to a support member, said one shaft can be removably affixed to the support member, thereby enabling disassembly of the cable guide means.

5. In a cable driven drum apparatus wherein a cable is rove at least part of the way about the drum to leave opposite moving cable ends which cross one another, the combination with said drum apparatus of a cable guide means for guiding the cable ends to and from the cable driven drum:
said guide means having a first spool and a second spool; the axial centerline of each spool being arranged parallel to each other, to the axial centerline of the cable drum, and normal to the cable which is rove thereabout;
spaced flanges on each spool, means forming spaced circumferentially extending grooves about each spool at a location spaced from said flanges;
means by which said spools are journaled in spaced relationship relative to each other with a marginal circumferentially extending edge portion of the flanges of the one spool being received in overlapping relationship respective to the marginal circumferentially extending edge portion of the flanges of the remaining spool, and with the grooves of the first spool being aligned respective to the corresponding grooves of the second spool to jointly form spaced passageways between the flanges and between the spools, through which a marginal length of the cable ends can be guidably placed so that a marginal length of the cable can be received through one of the passageways, roved about the cable drum, and returned through the remaining passageway, thereby preventing the opposite moving marginal cable ends from contacting one another.

6. The combination of claim 5 wherein the first spool is smaller than the second spool, the diameter of the large spool being of a size which provides a cable bending radius compatible with the cable being rove about the cable drum, so that the cable can be received by a marginal length of one of the grooves of the large spool before it is received about the drum, and thereafter the cable can be received by a marginal length of the remaining groove of the large spool to thereby contribute to maintaining marginal portions of the cable separated from one another as the cable is guided to and from the drum.

7. The combination of claim 5 wherein said means by which said spools are journaled in spaced relationship relative to each other includes a first and second shaft, each spool being rotatably received upon a shaft, the last said means supports one marginal end portion of each said shaft, a link affixed to the remaining end portion of each said shaft and capturing the spools on a central marginal length of the shafts, so that the link can be removed to enable replacement of the spools.

* * * * *